US008914881B2

(12) United States Patent
Lekies et al.

(10) Patent No.: US 8,914,881 B2
(45) Date of Patent: Dec. 16, 2014

(54) FLEXIBLE AND SECURE CLICKJACKING PROTECTION MECHANISM

(75) Inventors: Sebastian Lekies, Karlsruhe (DE); Martin Johns, Karlsruhe (DE)

(73) Assignee: SAP SE, Walldorf (DE)

(*) Notice: Subject to any disclaimer, the term of this patent is extended or adjusted under 35 U.S.C. 154(b) by 83 days.

(21) Appl. No.: 13/563,568

(22) Filed: Jul. 31, 2012

(65) Prior Publication Data

US 2014/0041023 A1 Feb. 6, 2014

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ............................................. 726/22; 380/28

(58) Field of Classification Search
USPC .......................................................... 726/22
See application file for complete search history.

(56) References Cited

U.S. PATENT DOCUMENTS

| 8,413,236 | B1* | 4/2013 | Hansen | 726/22 |
| 2008/0040653 | A1* | 2/2008 | Levine | 715/205 |
| 2008/0163128 | A1* | 7/2008 | Callanan et al. | 715/856 |
| 2010/0281107 | A1* | 11/2010 | Fallows et al. | 709/203 |
| 2010/0281537 | A1* | 11/2010 | Wang et al. | 726/22 |
| 2011/0321162 | A1* | 12/2011 | Gluck | 726/22 |
| 2011/0321168 | A1* | 12/2011 | Amit et al. | 726/26 |
| 2013/0111594 | A1* | 5/2013 | Amit et al. | 726/25 |

OTHER PUBLICATIONS

Gustav Rydstedt ; Clickjacking Vulnerability and Countermeasures ;Busting Frame Busting: a Study of Clickjacking Vulnerabilities on Popular Sites; Jun. 7, 2010; pp. 1-13.*
Marco Balduzzi et al., "A solution for the Automated Detection of Clickjacking Attacks," Proceedings of the ACM Symposium on Information, Computer and Communications Security, ASIACC'10, Apr. 2010, 10 pages.
Adam Barth et al., "Robust Defenses for Cross-Site Request Forgery," Proceedings of the ACM Conference on Computer and Communications Security, CCS'08, Oct. 2008, 13 pages.
Eddy Bordi, "Cursorjacking," [online], Dec. 21, 2010, retrieved from http://eddy.bordi.fr/securite/cursorjacking.html, 3 pages.
Franco Callegati et al., "Frightened by Links," IEEE Security & Privacy, vol. 7, Issue 6, Nov.-Dec. 2009, pp. 72-76.
Eric Y. Chen et al., "App Isolation: Get the Security of Multiple Browsers with Just One," Proceedings of the ACM Conference on Computer and Communications Security, CCS'11, Oct. 2011, 11 pages.
Coderrr, "Preventing Frame Busting and Click Jacking (UI Redressing)," [online] Feb. 13, 2009, retrieved from http://coderr.wordpress.com/2009/02/13/preventingframe-busting-and-click-jacking-ui-redressing/, 12 pages.

(Continued)

*Primary Examiner* — Mohammad W Reza
*Assistant Examiner* — Monjour Rahim
(74) *Attorney, Agent, or Firm* — Fish & Richardson P.C.

(57) ABSTRACT

Methods, systems, and computer-readable storage media for preventing a clickjacking attack on a web page. Implementations include inhibiting rendering of content of the web page, receiving a message from an embedding web page, the embedding web page having called the web page, the message including metadata, and determining whether the embedding web page is trusted based on the metadata, wherein rendering of content of the web page remains inhibited if the embedding web page is untrusted, and rendering of content of the web page is executed if the embedding web page is trusted.

16 Claims, 4 Drawing Sheets

(56) References Cited

OTHER PUBLICATIONS

Facebook Security, "Facebook, Washington State AG Target Clickjackers," [online], Facebook, Jan. 26, 2012, retrieved from https://www.facebook.com/notes/facebooksecurity/facebook-washington-state-ag-targetclickjackers/10150494427000766, 4 pages.

Chris Grier et al., "Secure Web Browsing with the OP Web Browser," Proceedings of the 2008 IEEE Symposium on Security and Privacy, SP'08, May 2008, 15 pages.

Steve Hanna et al., "The Emperor's New APIs: On the (In) Secure Usage of New Client-Side Primitives," Proceedings of the IEEE Oakland Web 2.0 Security and Privacy, W2SP 2010, May 2010, 10 pages.

Robert Hansen et al., "Clickjacking," SecTheory: Internet Security, Sep. 12, 2008, retrieved from http://www.sectheory.com/clickjacking.htm, 7 pages.

I. Hickson et al., "HTML 5," [online], W3C, Jun. 2008, retrieved from http://www.w3.org/TR/2008/WD-html5-20080610/web-browsers.html, 28, pages.

Lin-Shung Huang et al., "Clickjacking Attacks Unresolved," White paper, CyLab, Jul. 2011, 7 pages.

Sotiris Ioannidis et al., "Building a Secure Web Browser," Proceedings of the FREENIX Track: 2001 USENIX Annual Technical Conference, Jun. 2001, 8 pages.

Collin Jackson et al., "Protecting Browsers from DNS Rebinding Attacks," Proceedings of the ACM Conference on Computer and Communications Security, CCS'07, Oct.-Nov. 2007, 11 pages.

Collin Jackson et al., "Protecting Browser State from Web Privacy Attacks," Proceedings of the World Wide Web Conference Series, WWW'2006, May 2006, 8 pages.

Trevor Jim et al., "Defeating Script Injection Attacks with Browser-Enforced Embedded Policies," Proceedings of the World Wide Web Conference Series, WWW 2007, May 2007, 10 pages.

Martin Johns et al., "RequestRodeo: Client Side Protection Against Session Riding," Proceedings of the OWASP Europe 2006 Conference, May 2006, 13 pages.

Chris Karlof et al., "Dynamic Pharming Attacks and Locked Same-origin Policies for Web Browsers," Proceedings of the ACM Conference on Computer and Communications Security, CCS'07, Oct.-Nov. 2007, 14 pages.

Krzysztof Kotowicz, "Cursorjacking again," [online], Jan. 18, 2012, retrieved from http://blog.kotowicz.net/2012/01/cursorjacking-again.html, 3 pages.

Eric Law, "Combating ClickJacking With X-Frame-Options," [online], msdn Blogs, Mar. 30, 2010, retrieved from http://blogs.msdn.com/b/ieinternals/archive/2010/03/30/combating-clickjacking-with-x-frame-options.aspx, 3 pages.

Long Lu et al., "Blade: An Attack-Agnostic Approach for Preventing Drive-By Malware Infections," Proceedings of the ACM Conference on Computer and Communications Security, CCS'10, Oct. 2010, 11 pages.

Giorgio Maone, "NoScript CHANGELOG," [online], InformAction: Open Source Software, Jan. 2012, retrieved from http://noscript.net/changelog, 132 pages.

Giorgio Maone, "NoScript: ClearClick," [online], InformAction: Open Source Software, Jan. 2012, retrieved from http://noscript.net/faq#clearclick, 27 pages.

Michael Martin et al., "Automatic Generation of XSS and SQL Injection Attacks with Goal-Directed Model Checking," Proceedings of the 17th USENIX Security Symposium, Jul.-Aug. 2008, pp. 31-43.

Microsoft Corporation, "IE8 Security Part VII: ClickJacking Defenses," IEBlog, Jan. 27, 2009, 10 pages.

Yi-Min Wang et al., "Automated Web Patrol with Strider HoneyMonkeys: Finding Web Sites That Exploit Browser Vulnerabilities," Proceedings of the 12th Annual Network and Distributed System Security Symposium, NDSS'05, Feb. 2005, 15 pages.

Alexander Moshchuk et al., "A Crawler-based Study of Spyware on the Web," Proceedings of the 13th Annual Network and Distributed System Security Symposium, NDSS'06, Feb. 2006, 17 pages.

Eduardo Vela Nava, "ACS—Active Content Signatures," PST WEBZINE 0X04, Dec. 2009, 6 pages.

Eduardo Vela Nava et al., "Our Favorite XSS Filters and How to Attack Them," Jul. 2009 retrieved from http://www.blackhat.com/presentations/bhusa-09/VELANAVA/BHUSA09-VelaNava-FavoriteXSS-SLIDES.pdf, 108 pages.

OWASP, "Clickjacking," [online], Jul. 2011, Retrieved on Dec. 6, 2012 from https://www.owasp.org/index.php/Clickjacking#Bestfor-now implementation, 5 pages.

Niels Provos et al., "The Ghost in the Browser Analysis of Web-based Malware," Proceedings of the 16th USENIX Security Symposium, Aug. 2007, 9 pages.

D. Ross et al., "HTTP Header Frame Options: draft-gondrom-frame-options-01," [online], Sep. 2011, retrieved from http://tools.ietf.org/html/draft-gondrom-frameoptions-01#section-2.4, 7 pages.

Jesse Ruderman, "Bug 154957—iframe content background defaults to transparent," [online], Bugzilla@Mozilla, Jun. 2002, retrieved from https://bugzilla.mozilla.org/show_bug.cgi?id=154957, 9 pages.

Gustav Rydstedt et al., "Busting Frame Busting: a Study of Clickacking Vulnerabilities at Popular Sites," Proceedings of the IEEE Oakland Web 2.0 Security and Privacy, W2SP 2010, May 2010, 13 pages.

Eric Shepherd, "window.postMessage," [online], Mozilla Developer Network, Oct. 2011, retrieved from https://developer.mozilla.org/en/DOM/window.postMessage, 5 pages.

Anne van Kesteren, "The From-Origin Header," [online], W3C, Jul. 2011, retrieved from http://dvcs.w3.org/hg/from-origin/rawfile/tip/Overview.html, 4 pages.

Brandon Sterne et al., "Content Security Policy," [online], W3C, Nov. 2011, retrieved from http://www.w3.org/TR/CSP/, 17 pages.

Helen J. Wang et al., "The Multi-Principal OS Construction of the Gazelle Web Browser," Proceedings of the 18th USENIX Security Symposium, Aug. 2009, 16 pages.

WHATWG, "4.8.2 The iframe element—HTML Standard," [online], Dec. 2012, retrieved from http://www.whatwg.org/specs/web-apps/current-work/multipage/the-iframe-element.html, 26 pages.

Michal Zalewski, "Browser Security Handbook, part 2: Arbitrary page mashups (UI redressing)," [online], Mar. 2011, retrieved from http://code.google.com/p/browsersec/wiki/Part2#Arbitrary_page_mashups_(UI_redressing), 28 pages.

Michal Zalewski, "X-Frame-Options is worth less than you think," [online], Dec. 2011, retrieved from http://lcamtuf.coredump.cx/clickit/, 1 page.

Sebastian Lekies et al., "On the fragility and limitations of current Browser-provided Clickjacking protection schemes," Proceedings of the 6th USENIX Workshop on Offensive Technologies, WOOT'12, Aug. 2012, 11 pages.

\* cited by examiner

FLEXIBLE AND SECURE CLICKJACKING PROTECTION MECHANISM

BACKGROUND

There are many different kinds of attacks against web browsers and web applications ranging from Cross-Site Scripting (XSS) to Cross-Site Request Forgery (CSRF) to pharming attacks and many other attack vectors. An important and timely attack technique includes UI redressing, commonly referred to as clickjacking, in which an attacker tricks the unsuspicious victim into clicking on a specific element without his explicit knowledge about where he is actually clicking In order to protect their websites from being exploitable, many web masters deployed different countermeasures to this kind of attack.

SUMMARY

Implementations of the present disclosure include computer-implemented methods for preventing a clickjacking attack on a web page. Implementations include actions of inhibiting rendering of content of the web page, receiving a message from an embedding web page, the embedding web page having called the web page, the message including metadata, and determining whether the embedding web page is trusted based on the metadata, wherein rendering of content of the web page remains inhibited if the embedding web page is untrusted, and rendering of content of the web page is executed if the embedding web page is trusted.

In some implementations, the metadata includes an origin of the embedding web page.

In some implementations, determining whether the embedding web page is trusted includes comparing the origin to one or more trusted origins.

In some implementations, determining whether the embedding web page is trusted includes comparing the origin to one or more untrusted origins.

In some implementations, the origin includes a domain of the embedding web page.

In some implementations, the message includes a Post-Message.

In some implementations, actions further include registering a message handle, and sending a ready message.

In some implementations, the message includes a response to the ready message, and determining whether the embedding web page is trusted is performed in response to receiving the message.

In some implementations, receiving a message from an embedding web page and determining whether the embedding web page is trusted are performed in response to determining that the web page is called from a potentially untrusted viewport.

In some implementations, determining that the web page is called from a potentially untrusted viewport includes receiving one or more attributes indicating a manner in which the web page is called.

In some implementations, the one or more attributes include at least one of a parent attribute and an opener attribute.

In some implementations, the web page is determined to be called from a potentially untrusted viewport if the web page is to be displayed within a frame.

In some implementations, the web page is determined to be called from a potentially untrusted viewport if the web page is to be displayed in a popup window.

In some implementations, actions further include executing computer-readable code, the computer-readable code being provided in a web page document underlying the web page and providing instructions to perform inhibiting rendering of content of the web page, receiving a message from an embedding web page, and determining whether the embedding web page is trusted.

In some implementations, the computer-readable code is executed by a web browser.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a secure and flexible mechanism for inhibiting user interface (UI) redressing (referred to hereinafter as clickjacking) attacks. More particularly, implementations of the present disclosure provide web page origin identification such that an embedded web page does not render its content until an origin of a calling web page is authenticated. In some examples, the origin of the calling web page can be authenticated by comparing an origin of the calling web page to one or more trusted origins. If the origin matches a trusted origin, the embedded web page renders its content. In some examples, the origin of the calling web page can be authenticated by comparing an origin of the calling web page to one or more untrusted origins. If the origin matches an untrusted origin, the embedded web page does not render its content. In some implementations, the origin of the calling web page is provided to the embedded web page in a PostMessage that is sent from the embedded web page to the calling web page.

In some implementations, the embedded web page immediately stops rendering as the embedded web page is loaded. In some implementations, it is determined whether the embedded web page is called from a trusted viewport constellation. If the embedded web page is called from a trusted viewport constellation, the embedded web page proceeds to render its content without performing the web page origin authentication. If the embedded web page is called from an untrusted viewport constellation, the embedded web page performs the web page origin authentication. In some examples, the embedded web page is called from a trusted viewport constellation if it is determined that a user triggered calling of the embedded web page.

Figure 1:
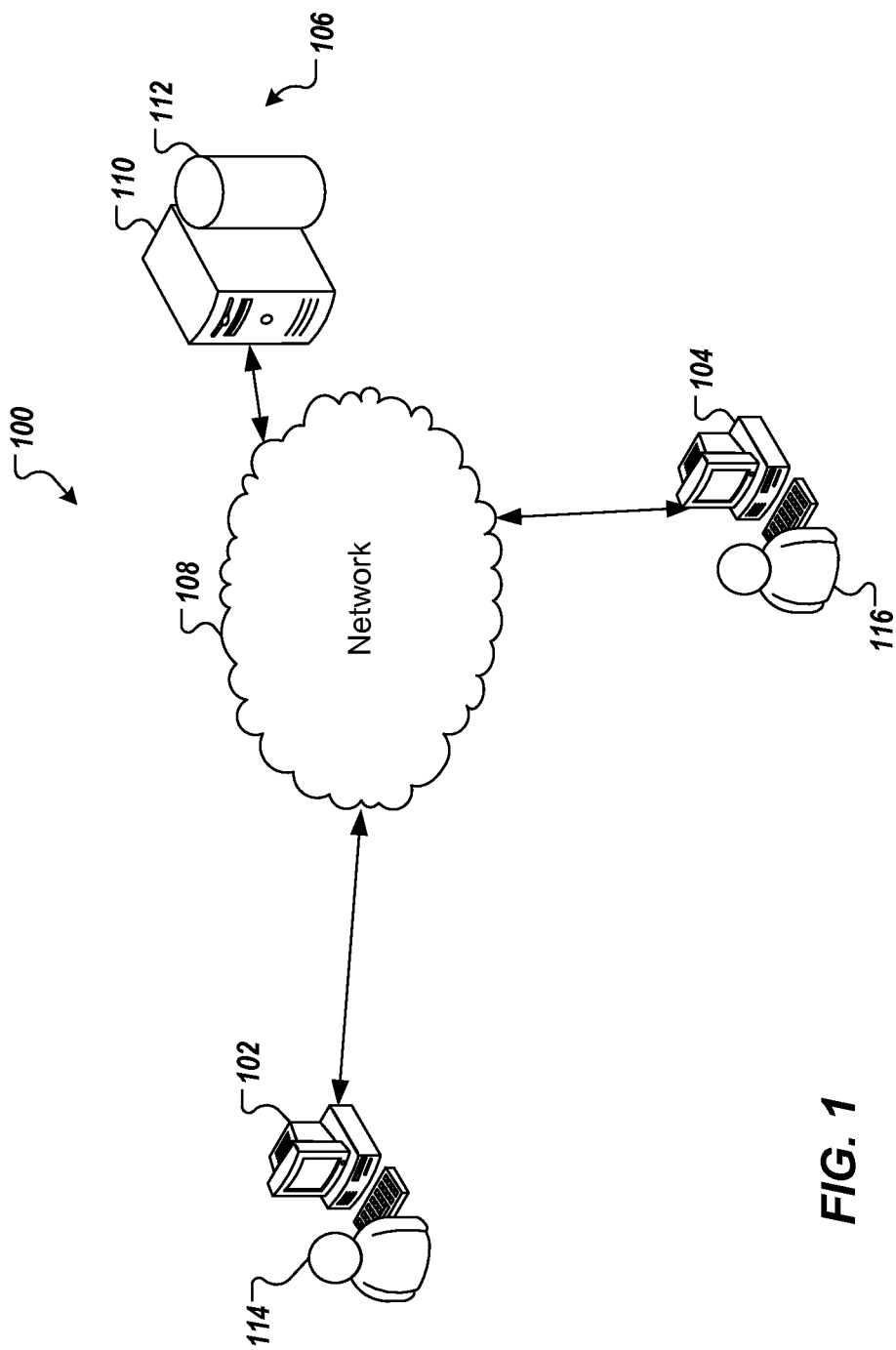
FIG. 1 depicts an example system that can execute implementations of the present disclosure.

FIG. 1 depicts an example system 100 that can execute implementations of the present disclosure. The example system 100 includes a first computing device 102, a second computing device 104, a server system 106 and a network 108. The first and second computing devices 102, 104 can each include any appropriate type of computing device such as a desktop computer, a laptop computer, a handheld computer, a tablet computing device, a personal digital assistant (PDA), a cellular telephone, a network appliance, a camera, a smart phone, an enhanced general packet radio service (EG-PRS) mobile phone, a media player, a navigation device, an email device, a game console, or a combination of any two or more of these data processing devices or other data processing devices. In the example system 100 of FIG. 1, the computing devices are depicted as desktop computers.

The computing devices 102, 104 can communicate with one another and/or the server system 106 over the network 108. The network 108 can include a large computer network, such as a local area network (LAN), a wide area network (WAN), the Internet, a cellular network, or a combination thereof connecting any number of mobile computing devices, fixed computing devices and server systems. The server system 106 can include one or more computing devices 110 and one or more machine-readable repositories, or databases 112.

For purposes of illustration, and as discussed in further detail below, a user 114 can use the first computing device 102 to interact with one or more web pages of a web site that is hosted by the server system 106. In some examples, interaction between the first computing device 102 and the server system 106 includes executing a web browser on the first computing device 102 to display the one or more web pages. In some examples, the one or more web pages include interaction elements such as dialogue boxes and clickable buttons that enable the user 114 to provide input to the web page. A user 116 using the second computing device 104 can be a malicious user that seeks to exploit potential vulnerabilities of the interaction between the computing device 102 and the server system 106. As discussed in further detail herein, implementations of the present disclosure inhibit attacks that exploit vulnerabilities in web browser interaction.

Before discussing details of implementations of the present disclosure, clickjacking will be briefly discussed. In this manner, a general context will be provided to assist in understanding the details and benefits of implementations of the present disclosure.

Clickjacking is an attack that lures an unsuspicious user (e.g., the user 114 of FIG. 1) into interacting with (e.g., clicking on) an element that is different to what the user perceives that they are interacting with. In some cases, the attacker (e.g., the malicious user 116 of FIG. 1) tricks the user into performing such an interaction in conjunction with an authenticated UI. In some examples, an authenticated UI can include a UI displayed within a web page that requires user credentials to access. That is, the user seeking access to the UI must first be authenticated before the user is granted access to the UI. In some cases, the attacker uses clickjacking to conduct state changing actions and/or to extract sensitive information without user consent.

In general, a clickjacking attack can be broken down into stages. A web browser (e.g., a web browser executed by the first computing device 102 of FIG. 1) can be forced to render a third-party UI to which the user is authenticated (e.g., a UI through which the user is able to access sensitive information and/or to conduct state changing actions). In some instances, the third-party UI is within a container that is controlled by the attacker. Example containers can include popup windows and iframe elements. The third-party UI is disguised in such a manner that the user is unable to recognize or perceive the third-party UI. In some examples, the third-party UI can be disguised by totally or partially covering the third-party UI with other elements, by reducing the size of the third-party UI, and/or by displaying the third-party UI for only a very short amount of time (e.g., through rapid page navigation). The user is lured into interacting with the disguised third-party UI without the user being aware of the presence of the third-party UI.

Figure 2B:
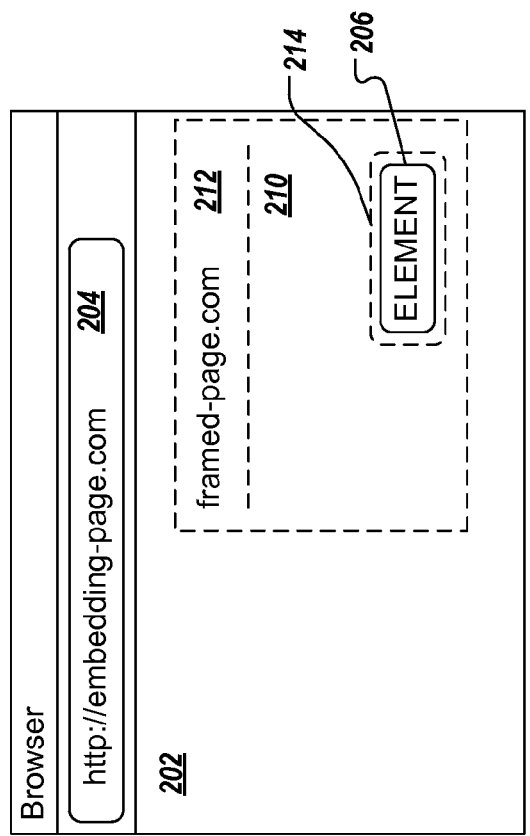
FIGS. 2A and 2B depict an example clickjacking attack.
Figure 2A:
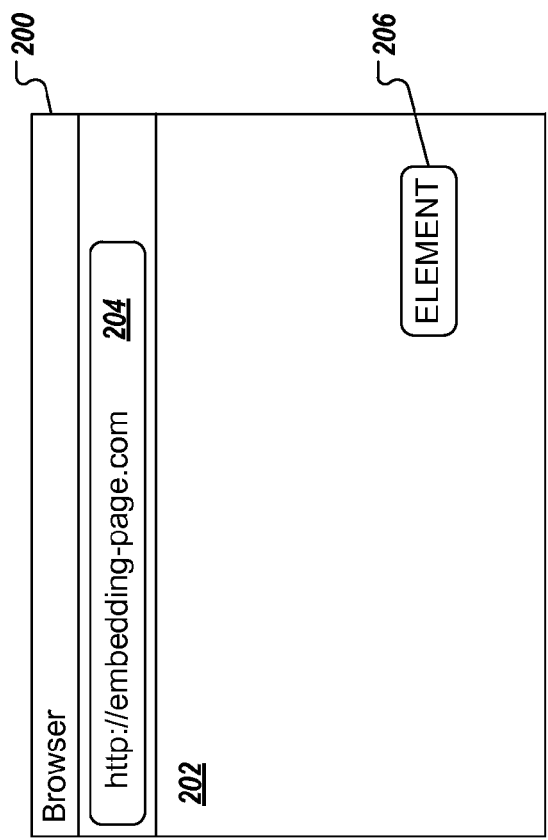

Referring to FIGS. 2A and 2B, an example clickjacking attack will be discussed. With particular reference to FIG. 2A, a web browser 200 is depicted. The web browser 200 displays a web page 202. In the depicted example, the web page 202 can be provided from an example web site that is associated with a uniform resource locator (URL) 204 ("embedding-page.com"). The web page 202 includes an element 206. In some examples, the element 206 can include a clickable icon (e.g., a button). In some examples, the element 206 can include a dialogue box into which text can be input. In some examples, the web page 202 can be controlled by a malicious user.

With particular reference to FIG. 2B, a disguised web page 210 can be rendered. In the depicted example, the disguised web page 210 is provided as a framed web page (e.g., an iframe element) that is framed over the web page 202. In the depicted example, the disguised web page 210 can be provided from an example web site that is associated with a URL 212 ("framed-page.com"). In some examples, the disguised web page 210 is a third-party web page that provides a third-party UI. In the depicted example, the third-party UI includes an element 214. In some examples, the element 214 can include a clickable icon (e.g., a button). In some examples, the element 214 can include a dialogue box into which text can be input. In some examples, the disguised web page 210 can be an authenticated web page.

In the example of FIG. 2B, the web page 202 and the disguised web page 210 are arranged such that a user viewing the web browser 200 perceives only the web page 202 and does not perceive the web page 210. Further, the web page 202 and the disguised web page 210 are arranged such that, when the user attempts to interact with (e.g., click on) the element 206, the interaction is actually imparted on the element 214. For example, when the user attempts to click on the element 206, the element 214 is actually clicked on.

An example clickjacking attack using iframes will be discussed in view of FIGS. 2A and 2B. It is appreciated that implementations of the present disclosure are applicable to other clickjacking attacks (e.g., using popup windows). An attacker creates a website called "funnykittengame.org" that includes a game and displays a web page displaying a game UI. In the context of FIGS. 2A and 2B, the web page of the game can correspond to the web page 202. In this example, the game lures an unsuspicious user into interacting with the web page. While the user plays the game, the attacker's website dynamically creates a transparent iframe element pointing to a web page associated with a banking application of the user at "secure-banking.com." In the context of FIGS. 2A and 2B, the web page of the banking application corresponds to the disguised web page 210.

Because the iframe is disguised (e.g., is transparent), the user is not able to perceive the iframe and is still under the assumption that s/he is still interacting with the game UI. When the user clicks an element, the corresponding click is not sent to the game UI, but is instead sent to the banking application and, for example, can cause state changes in the banking application. For example, the user might perceive that s/he is clicking on the element 206 of the web page 202, but is actually clicking on the element 214 of the disguised web page 210.

Implementations of the present disclosure provide a secure and flexible mechanism to inhibit clickjacking attacks. More particularly, implementations include web page origin authentication that can be provided in one or more web pages. In some examples, the web page origin authentication can be provided as a script (e.g., Javacript) and/or using cascading style sheets (CSS) that is provided in each web page of the one or more web pages. Whenever a web page that is outfitted with the web page origin authentication of the present disclosure is loaded into a container (such as an iframe or a popup window), the embedding web page is required to prove its identity before any rendering occurs. Based on the received identity information, the framed web page is determines whether to reveal its content. If the framed web page does not reveal its content, user interactions (e.g., clicks) are not able to be input to the framed web page.

In some implementations, web page origin authentication includes inhibiting rendering of content in the to-be-rendered (or embedded) web page (e.g., the disguised web page 210 of FIG. 2B) until an identity of the calling (or embedding) web page (e.g., the web page 202 of FIGS. 2A and 2B) can be authenticated. In some examples, CSS can be used to set a display property of a body element of the web page to "none." This can be achieved using the following example listing:

---
Listing 1: Stopping the Rendering Process
---
```
<style>
  body { display:none; }
</style>
```
---

After content rendering has been inhibited, the embedded web page authenticates the identity of the embedding web page. In some examples, the web page authentication performed by the embedded web page uses the PostMessage application program interface (API). The PostMessage API is a mechanism through which two web browser windows are capable of communicating across domain boundaries in a secure manner. In some examples, a PostMessage can be sent from a sending web page (e.g., provided in a web browser window) to a receiving web page (e.g., provided in another web browser window) by calling the method postMessage (message, targetOrigin) of the window object that is to receive the message. In the context of the present disclosure, the embedding web page can, as a sending web page, send a PostMessage to the embedded web page, as the receiving web page. While the message attribute takes a string message, the targetOrigin represents the origin of the receiving web page (e.g., the embedded web page).

In order to receive such a PostMessage, the receiving page (e.g., the embedded web page) registers an event handler function for the "message" event which is triggered whenever a PostMessage arrives. This can be achieved using the following example listing:

---
Listing 2: Example PostMessage Handler (excerpt)
---
```
function handlePostMessage(event){
    if(event.origin === 'http :// example .net'){
        bodyElement . style . display = 'block';
    }
}
```
---

The PostMessage API provides security guarantees including confidentiality and authenticity. With regard to confidentiality, the web browser guarantees that a PostMessage is only delivered to the intended recipient, if the targetOrigin specified during the method call matches the origin of the receiving web page. In some examples, if confidentiality is not required, the sending web page can specify a wildcard (e.g., *) as targetOrigin. With regard to authenticity, when receiving a message via the event handler function, the web browser also passes some metadata to the receiving web page. In some examples, this metadata can include the origin of the sending web page. Consequently, the PostMessage API can be used to verify the authenticity of the sending web page.

Accordingly, whenever an embedded web page (e.g., the disguised web page 210 of FIG. 2B) receives a PostMessage from an embedding web page (e.g., the web page 202 of FIGS. 2A and 2B), the embedded web page is able to obtain information about its embedding context. In accordance with implementations of the present disclosure, this feature can be used to create a whitelist-based or blacklist-based protection approach. In this manner, framing or popup windows can be allowed to certain trusted parties and can be denied to untrusted parties (e.g., attackers). Consequently, whenever a web page includes the web page origin authentication of the present disclosure, the web page forces an embedding web page to send a PostMessage.

Based on the received origin-value, the web page (e.g., the embedded web page) can selectively allow or deny cross-domain resources to embed the web page within frames and/or popups. More particularly, if the received identity information reveals that the sending web page (e.g., the embedding web page) is indeed a web page associated with a trusted third-party, the web page origin authentication of the present disclosure triggers the rendering process by setting the display attribute of the body element to the value "block." If the sender is untrusted or no PostMessage is received, rendering of the web page content remains inhibited.

In general, the term viewport constellation subsumes all ways to render a web page (e.g., within a frame, within a popup window, within a normal web browser window). A trusted viewport constellation includes a viewport constellation that an attacker is not able to gain any control over. An untrusted viewport constellation includes a viewport constellation that an attacker could potentially have navigational and/or rendering control over (e.g., popups, frames). Consequently, clickjacking attacks are possible in untrusted viewport constellations.

In some implementations, the web page origin authentication can detect untrusted viewport constellations. More particularly, while the PostMessage approach discussed above can be implemented for web pages loaded within frames and popups, it will not work for web pages that are directly loaded by the user. For example, if the user enters a URL into a new browser window (as opposed to the embedding web page entering the URL), there is no other web page that would send the PostMessage. Consequently, implementations of the present disclosure determine whether a user directly triggered loading of a web page within a frame or popup, or whether the web page was opened (embedded) by another web page (an embedding web page).

In some implementations, attributes are checked to determine whether loading of the web page was triggered by the user. In some examples, the attributes include Javascript attributes such as window.opener and window.parent. The window.opener (or opener) attribute is present whenever a web page was opened as a popup window. The opener attribute thereby contains a window handle for the window/tab that triggered the creation of the popup. The window.parent (or parent) attribute is always present (e.g., within the document object model (DOM) of the web page). Whenever a web page is framed by another web page, the parent attribute points to the embedding web page. When a web page is not framed, the parent attribute points to the same value as the window.self (or self) attribute.

By evaluating the opener attribute and the parent attribute, it can be determined whether a potentially malicious situation is present. This can be achieved using the following example listing:

---
Listing 3: View-port Detection (Excerpt)

```
<script>
    if(parent !== self || opener !== null ){
        window.addEventListener ("message",
            handlePostMessage );
    } else {
        bodyElement.style.display = 'block';
    }
</script>
```
---

More particularly, whenever a web page is directly requested by the user, the rendering process can be immediately triggered (e.g., inhibiting the rendering process is not performed, or is resolved). However, when a web page was embedded via a frame or a popup, rendering is postponed until the web page identity is authenticated.

In some implementations, when embedding a web page containing the web page origin authentication of the present disclosure, the embedding page is to send the PostMessage at some point in time. In some examples, there is no mechanism for the embedding web page to determine whether the content load and registration of the PostMessage handler has already taken place within the embedded web page. Consequently, if the embedding web page sends the PostMessage too early, the embedded web page would never receive the PostMessage. Consequently, rendering would never occur.

Accordingly, implementations of the present disclosure use the PostMessage API to ensure that the PostMessage is sent only after the PostMessage can be received. In some implementations, before rendering the iframe element (e.g., within a header of the web page), the embedding web page registers a PostMessage handler. The PostMessage handler of the embedding web page waits for a message from the embedded web page. When the PostMessage handler of the embedded page is registered (e.g., as discussed above with reference to Listing 2), the embedding web page is able to determine that the embedded web page is able to receive the PostMessage.

In view of the foregoing, a general flow of implementations of the web page origin authentication of the present disclosure will be discussed. Although the general flow is discussed in terms of framing, it is appreciated that implementations of the present disclosure are applicable to other scenarios such as popups.

An embedding web page (e.g., the web page 202 of FIGS. 2A and 2B) is loaded into a web browser (e.g., the web browser 200 of FIGS. 2A and 2B). The embedding web page registers a PostMessage handler that is able to receive PostMessages. A frame is inserted into the DOM of the embedding web page to call an embedded web page. In response, the web browser initiates a rendering process of the frame in an effort to render the embedded web page (e.g., the disguised web page 210 of FIG. 2B). The embedded web page, which includes the web page origin authentication of the present disclosure, loads and immediately inhibits the rendering process by setting the display attribute of the body element to a first value (e.g., as discussed above with reference to Listing 1). The embedded web page detects its current view-port constellation (e.g., as discussed above with reference to Listing 3). If the embedded web page is not framed or opened as a popup window, the embedded web page continues the rendering process.

If the embedded web page is framed or opened as a popup window, the embedded web page registers a PostMessage handler and sends a message to its parent or opener window (of the embedding web page) stating that the web page loading process has finished. In other words, the embedded web page sends a message indicating that the PostMessage handler is registered. In response to the message, the PostMessage handler of the embedding web page sends a PostMessage to the embedded web page. The embedded web page receives the reply PostMessage and uses attributes (e.g., parent attribute and/or opener attribute) to verify the origin of the embedding web page. If the origin is legitimate, the embedded web page reveals its content by setting the display attribute of the body element to a second value. If the origin is not legitimate, the embedded web page does nothing and the content of the embedded web page remains un-rendered.

In some implementations, the web page origin authentication can be provided using the following example listing, which incorporates Listings 1, 2 and 3 discussed above:

---
Listing 4: Web Page Origin Authentication

```
<style>
    body { display : none ; }
</style>
<script>
var bodyElement = document.
    getElementsByTagName ('body') [0];
function handlePostMessage(event){
    if(event.origin === 'http :// example .net'){
        bodyElement . style . display = 'block';
    }
}
if(parent !== self || opener !== null ){
    window.addEventListener ("message",
        handlePostMessage );
} else {
    bodyElement.style.display = 'block';
}
</script>
```
---

Implementations of the present disclosure are operable with standard features that are provided across all of the commonly used web browsers. Consequently, implementations of the present disclosure do not require modification and/or addition of web browser features to guarantee an immediate availability across platforms. Further, implementations of the present disclosure provide a configurable mechanism, such that framing or popup windows can be allowed to certain trusted parties and at the same time denied to untrusted parties (e.g., potential attackers). Implementations of the present disclosure not only focus on anti-framing, but also on other elements that are able to render third-party content.

Implementations of the present disclosure protect against various clickjacking attacks including, but not limited to, double clickjacking, clickjacking using history navigation, nested clickjacking and drag and drop of CSS style elements.

With regard to double clickjacking, a basic assumption of is that an attacker is able to open and render arbitrary web pages within a popup window. When doing so with a web page that is protected with the web page origin authentication of the present disclosure, the opener attribute is present. Consequently, the web page origin authentication is able to detect a potentially untrusted view-port constellation, preventing the web page from rendering. In this manner, the clickjacking attack cannot be conducted. With regard to clickjacking using history navigation, such an attack relies on opening a web page within a popup window. By detecting this action and reacting as described herein, this type of clickjacking attack is also prevented. With regard to nested clickjacking, nested clickjacking is avoided because the web page origin authentication requires the parent and not the top window to prove its identity to the framed web page. If a multi-level frame hierarchy exists, each parent frame must again prove its identity to the embedded web page. With regard to drag and drop of CSS style elements, by immediately setting the display attribute of the body element to none, dropping of content onto the embedded web page is disabled. Consequently, no style element can be dropped unless the framing page has proven that it possesses a trusted identity.

Figure 3:
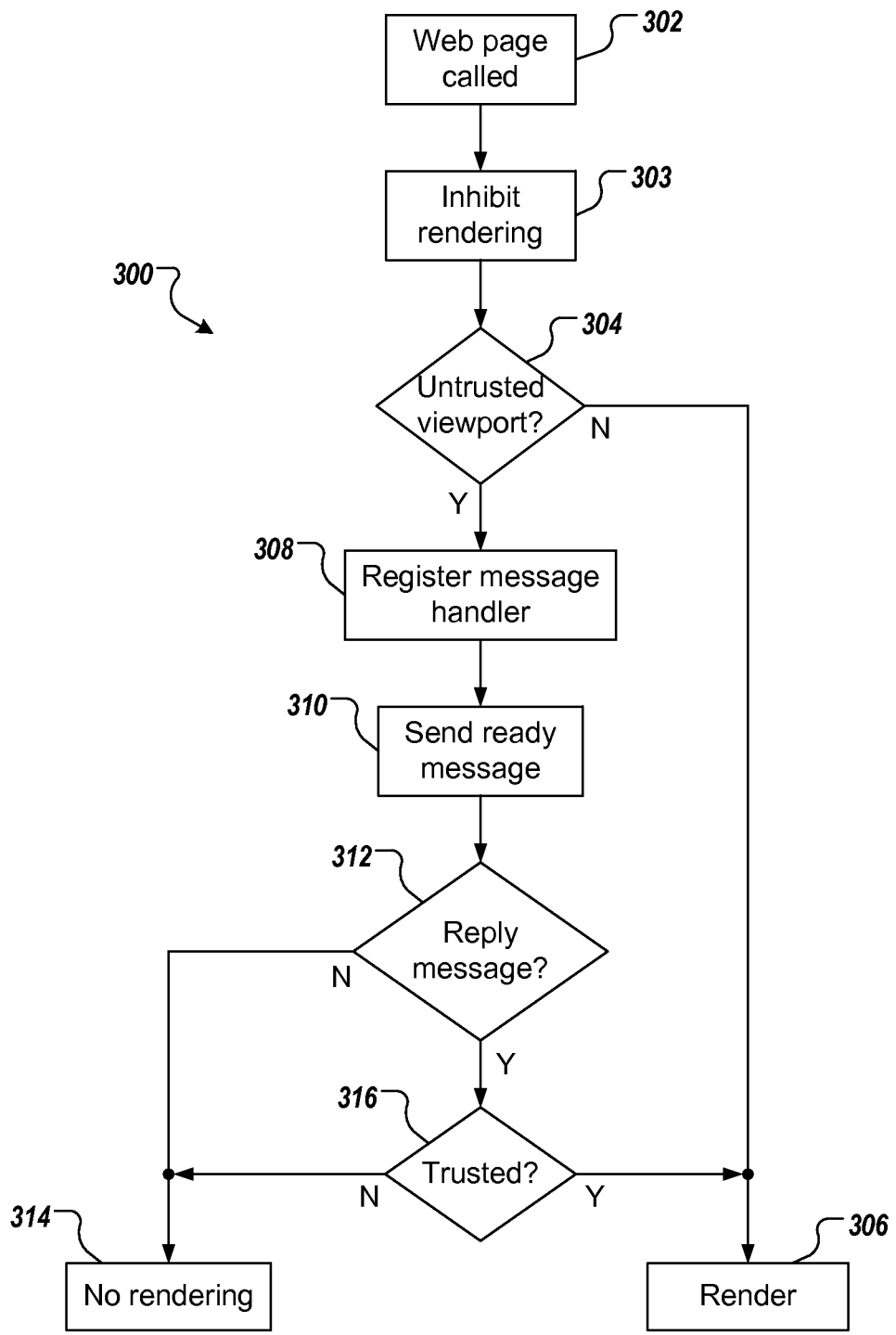
FIG. 3 depicts an example process that can be executed in implementations of the present disclosure.

FIG. 3 depicts an example process 300 that can be executed in implementations of the present disclosure. In some examples, the example process can be implemented as computer-readable code (e.g., Javascript, CSS) that is provided in a web page document. For example, the example process 300, or portions thereof, can be executed using computer-readable code that is provided in the web page document of the disguised web page 210 of FIG. 2B.

A web page is called (302). Rendering of the web page is inhibited (303). For example, a display attribute of a body element of the web page is set to a first value (e.g., none). It is determined whether the web page is called from a potentially untrusted viewport (304). For example, an opener attribute and/or a parent attribute can be used to determine whether the web page is called from a potentially untrusted viewport. If the web page has not been called from a potentially untrusted viewport (e.g., a user called the web page), rendering of the web page content is allowed to continue (306). For example, the display attribute of the body element of the web page is set to a second value (e.g., block).

If the web page has been called from a potentially untrusted viewport (e.g., in a frame or in a popup), the web page registers a message handler (308). For example, the web page registers a PostMessage handler. The web page sends a ready message (310). For example, and using the PostMessage handler, the web page sends a ready message to an embedding web page that called the web page. It is determined whether a reply message is received (312). If the web page does not receive a reply message, rendering remains inhibited (314). For example, the display attribute of the body element of the web page remains set to the first value. If the web page receives a reply message, it is determined whether the embedding web page, which sent the reply message, is trusted (316).

For example, metadata provided with the reply message can be used to determine whether an origin of the reply message is associated with a trusted origin or an untrusted origin. If the embedding web page is trusted, rendering of the web page content is allowed (306). If the embedding web page is not trusted, rendering remains inhibited (314).

Figure 4:
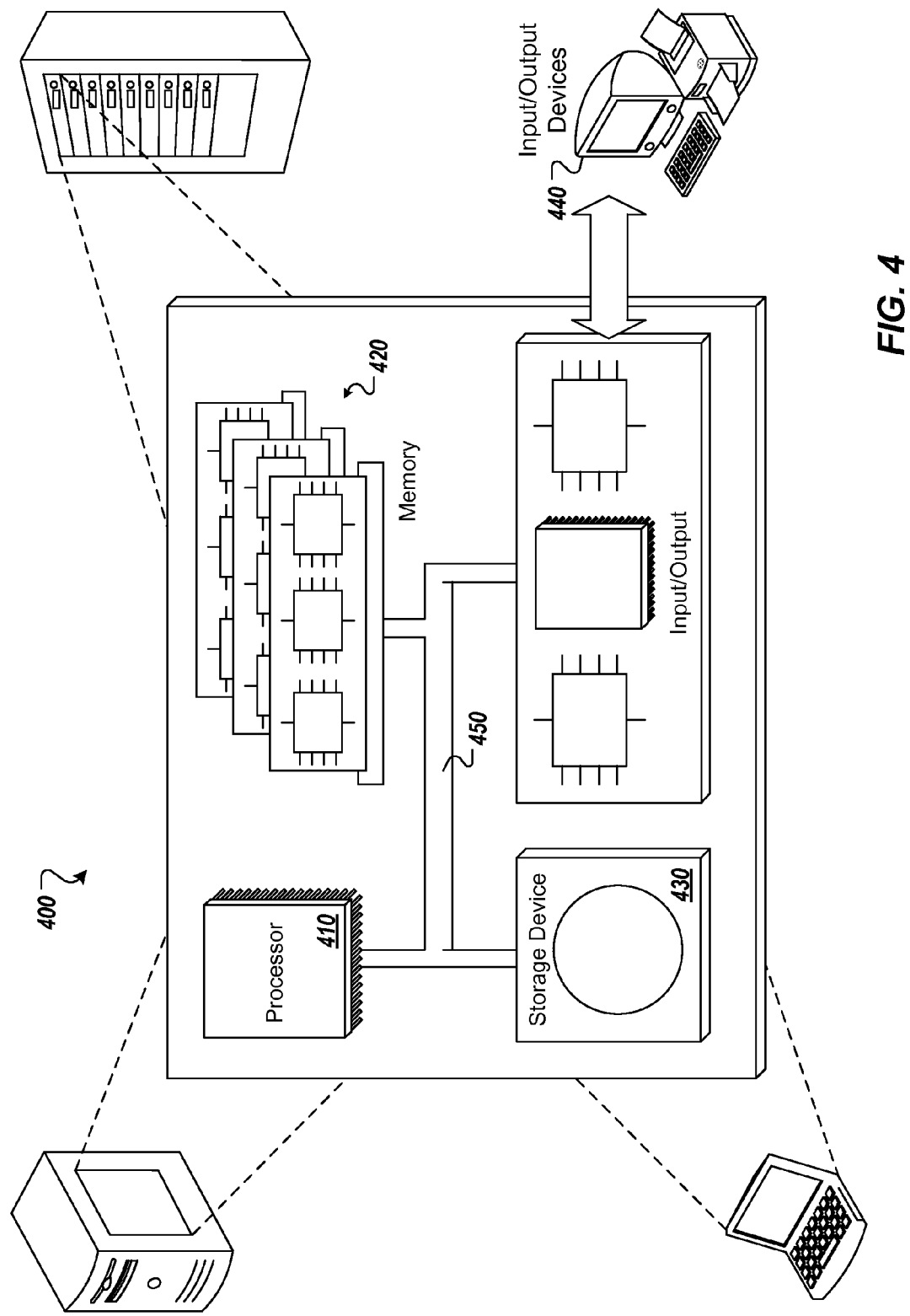
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. Elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for preventing a clickjacking attack on a web page, the method being executed using one or more processors and comprising:
   receiving a request for the web page; and
   in response to the request, providing a web page document underlying the web page, the web page document comprising instructions that are executed in response to loading of the web page for:
      inhibiting rendering of content of the web page;
      receiving a message from an embedding web page, the embedding web page having called the web page, the message comprising an origin of the embedding web page and
      determining whether the embedding web page is trusted based on an authentication of the origin, wherein rendering of content of the web page remains inhibited if the embedding web page is untrusted, and rendering of content of the web page is executed if the embedding web page is trusted.

2. The method of claim 1, wherein the authentication of the origin comprises detection of untrusted viewpoint constellations of the embedding web page.

3. The method of claim 1, wherein determining whether the embedding web page is trusted comprises comparing the origin to one or more trusted origins.

4. The method of claim 1, wherein determining whether the embedding web page is trusted comprises comparing the origin to one or more untrusted origins.

5. The method of claim 1, wherein the origin comprises a domain of the embedding web page.

6. The method of claim 1, wherein the message comprises a PostMessage.

7. The method of claim 1, further comprising:
   registering a message handler; and
   sending a ready message.

8. The method of claim 7, wherein the message comprises a response to the ready message, and determining whether the embedding web page is trusted is performed in response to receiving the message.

9. The method of claim 1, wherein receiving a message from an embedding web page and determining whether the embedding web page is trusted are performed in response to determining that the web page is called from a potentially untrusted viewport.

10. The method of claim 9, wherein determining that the web page is called from a potentially untrusted viewport comprises receiving one or more attributes indicating a manner in which the web page is called.

11. The method of claim 10, wherein the one or more attributes comprise at least one of a parent attribute and an opener attribute.

12. The method of claim 9, wherein the web page is determined to be called from a potentially untrusted viewport if the web page is to be displayed within a frame.

13. The method of claim 9, wherein the web page is determined to be called from a potentially untrusted viewport if the web page is to be displayed in a popup window.

14. The method of claim 1, wherein the instructions are executed by a web browser.

15. A non-transitory computer-readable storage medium coupled to one or more processors and having instructions stored thereon which, when executed by the one or more processors, cause the one or more processors to perform operations for preventing a clickjacking attack on a web page, the operations comprising:
   receiving a request for the web page; and
   in response to the request, providing a web page document underlying the web page, the web page document comprising instructions that are executed in response to loading of the web page for:
      inhibiting rendering of content of the web page;
      receiving a message from an embedding web page, the embedding web page having called the web page, the message comprising an origin of the embedding web page; and
      determining whether the embedding web page is trusted based on an authentication of the origin, wherein rendering of content of the web page remains inhibited if the embedding web page is untrusted, and rendering of content of the web page is executed if the embedding web page is trusted.

16. A system, comprising:
a computing device that executes a web browser, the web browser being operable to execute instructions provided in web page documents for preventing a clickjacking attack on a web page, the operations comprising:
  sending a request for the web page; and
  receiving a web page document underlying the web page, the web page document comprising instructions that are executed by the web browser in response to loading of the web page for:
    inhibiting rendering of content of the web page;
    receiving a message from an embedding web page, the embedding web page having called the web page, the message comprising an origin of the embedding web page; and
    determining whether the embedding web page is trusted based on an authentication of the origin, wherein rendering of content of the web page remains inhibited if the embedding web page is untrusted, and rendering of content of the web page is executed if the embedding web page is trusted.

* * * * *